FREYLINGHOUSEN & HEILMAN.
Corn-Planter.
No. 24,452. Patented June 21, 1859.
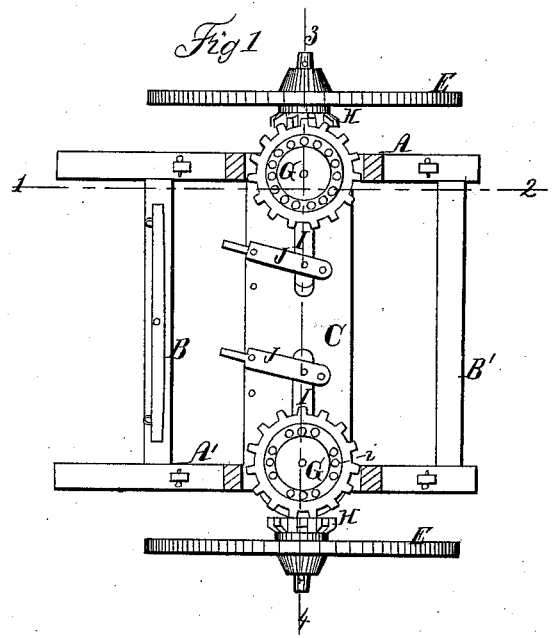
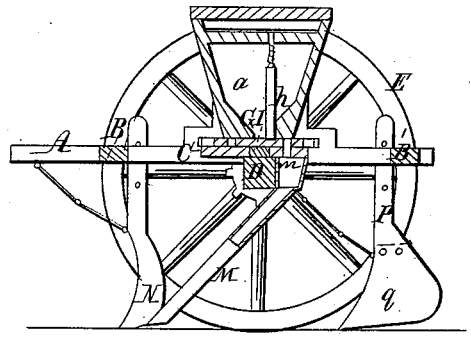
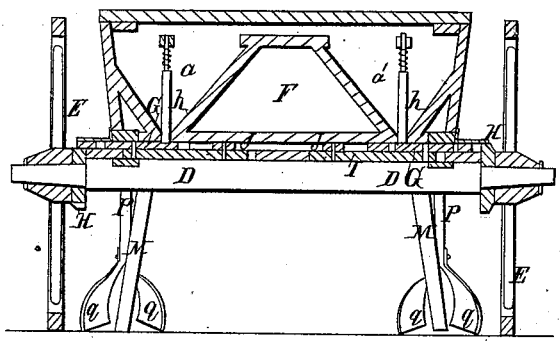
Witnesses,
L. R. Trechler
Isaac Sanderson
Inventors;
P. H. Freylinghousen
Jacob Heilman

UNITED STATES PATENT OFFICE.

P. H. FREYLINGHOUSEN AND J. G. HEILMAN, OF JONESTOWN, PA.

IMPROVEMENT IN CORN-PLANTERS.

Specification forming part of Letters Patent No. 24,452, dated June 21, 1859.

*To all whom it may concern:*

Be it known that we, P. H. FREYLINGHOUSEN and J. G. HEILMAN, of Joneston, Lebanon county, Pennsylvania, have invented certain new and useful Improvements in Corn-Planters; and we do hereby declare the following to be a full, clear, and exact description of the same, reference being had to the accompanying drawings, and to the letters of reference marked thereon.

Our invention relates to an improvement in that class of corn-planters in which perforated wheels situated beneath a hopper and driven by wheels on the axle are used; and our improvement consists in hanging the perforated wheels to sliding bars, so that the orifices of the hopper may be closed by the wheels at the same time that the latter are thrown out of gear by the drawing inward of the said sliding bars, as more fully described hereinafter.

In order to enable others skilled in this class of machinery to make and use our invention, we will now proceed to describe its construction and operation.

On reference to the accompanying drawings, which form part of this specification, Figure 1 is a plan view of our improved corn-planter with the hopper removed. Fig. 2 is a sectional elevation on the line 1 2, Fig. 1; Fig. 3, a transverse sectional elevation of the machine on the line 3 4, Fig. 1.

Similar letters refer to similar parts throughout the several views.

The frame of our improved corn-planter consists of the opposite side bars, A and A', connected together by the front transverse bar, B, rear bar, B', and the intermediate platform, C, to which, as well as to the side bars, is secured the axle D, carrying a wheel, E, at each end.

Above the platform C is erected a box, F, formed into two hoppers, *a* and *a'*, and between this box and the platform a cog-wheel, G, is situated, on each side of the machine, each wheel gearing into a pinion, H, on the hub of one of the wheels E. Each cog-wheel G is hung to a pin on a sliding bar, I, which fits into and is guided by a slot in the platform C, and which is so connected to a lever, J, that by moving the said lever the cog-wheel G may be slid in and out of gear with the pinion H. Each of the cog-wheels G is perforated through the face with a number of holes large enough to admit a kernel of corn, and in each of the hoppers is an opening which coincides with one or the other of the holes in the wheel as the latter revolves. A vertical bar, *h*, in the interior of each hopper serves to guide the kernels of corn into the holes of the wheel, and to prevent the admission of more than one kernel at a time.

In the platform, and under each of the cog-wheels G, is an orifice, *m*, which also coincides with one or other of the holes in the wheel G as the latter revolves. Immediately beneath each opening *m* of the platform is situated the mouth of a tube, M, the lower end of which terminates at the rear of the plow-teeth N, one of which is so secured to each of the side bars of the frame as to be readily adjusted perpendicularly.

To each of the side bars, and in rear of the hopper, is also secured a bar, P, furnished at the bottom with two curved blades, *q q*, so arranged as to restore the earth which has been turned up by the plow-tooth N to the furrow, and thus cover up the planted corn.

As the machine is drawn over the groud then wheels G (providing they be in gear with their respective pinions) will turn, and each hole in succession will receive a kernel of corn, which will be carried round with the wheel until the orifice which contains it coincides with the opening *m* of the platform, when the kernel will drop into the mouth of the tube M and slide down the latter into the furrow made by the plow-tooth N, the furrow being subsequently closed by the action of the curved blades *q* as the machine continues to move.

When the machine has to be conveyed from one part of the field to another without depositing any corn in the ground, the sliding bars I I are moved inward by means of the levers J J, thus drawing the wheels G out of gear with the wheels H, the wheels G at the same time closing the openings at the bottom of the hopper and preventing the further egress of the corn. The plow-teeth N and bars P, with their blades, are then elevated above the ground and the tubes M slid back and their points raised, so as not to obstruct the free movements of the machine.

We do not claim, broadly, the hoppers in combination with the perforated wheels, the latter being driven by wheels on the axle, as such a device has been before used; but

We claim and desire to secure by Letters Patent—

The perforated wheels G, when hung to the sliding bars I, and situated in respect to the hopper *a* and wheels H, and otherwise arranged, as herein set forth, so that on moving the said bars I inward the wheels G may be drawn out of gear and the orifices of the hopper at the same time closed by the wheels.

In testimony whereof we have signed our names to this specification in the presence of two subscribing witnesses.

P. H. FREYLINGHOUSEN.
J. G. HEILMAN.

Witnesses:
S. K. TREICHLER,
ISAAC SANDERSON.